United States Patent [19]

Kohl

[11] 4,360,364

[45] Nov. 23, 1982

[54] FILTERING METHOD AND APPARATUS THEREFOR

[75] Inventor: Arthur L. Kohl, Woodland Hills, Calif.

[73] Assignee: Rockwell International Corporation, El Segundo, Calif.

[21] Appl. No.: 331,932

[22] Filed: Dec. 17, 1981

Related U.S. Application Data

[63] Continuation of Ser. No. 963,551, Nov. 24, 1978, abandoned.

[51] Int. Cl.³ .................. B01D 46/04; B01D 46/32
[52] U.S. Cl. ................................... 55/96; 55/77;
55/98; 55/99; 55/284; 55/318; 55/390; 55/482;
55/512
[58] Field of Search .............. 55/74, 77, 98, 99, 282,
55/284, 286, 317, 318, 320, 328, 329, 390, 479,
482, 486, 488, 512, 516

[56] References Cited

U.S. PATENT DOCUMENTS

| | | | |
|---|---|---|---|
| 1,570,869 | 1/1926 | Thomson et al. | 55/99 |
| 3,296,775 | 1/1967 | Squires | 55/98 |
| 3,589,863 | 6/1971 | Frevel et al. | 55/98 X |
| 3,716,969 | 2/1973 | Maeda | 55/390 |
| 3,917,458 | 11/1975 | Polak | 55/99 X |
| 4,017,278 | 4/1977 | Reese | 55/282 X |
| 4,033,117 | 7/1977 | Smith | 55/99 X |
| 4,083,701 | 4/1978 | Noack | 55/99 X |
| 4,149,858 | 4/1979 | Noack et al. | 55/99 X |

Primary Examiner—Richard L. Chiesa
Attorney, Agent, or Firm—Clark E. DeLarvin; Henry Kolin

[57] ABSTRACT

A method of and apparatus for removing particulate contaminants from a gaseous stream. Broadly, the apparatus comprises a housing containing a substantially vertical granular material retention member having upstream and downstream faces, a substantially vertical microporous gas filter element, said member and element being spaced apart to provide a zone for the passage of granular material therethrough. The housing further comprises a gas inlet means, a gas outlet means and means for moving a body of granular material through said zone. In operation, a gaseous stream containing particulate contaminants passes through the gas inlet means and upstream face of the granular material retention member, passing through said member, said body of granular material, the microporous gas filter element and then out the gas outlet means. The particulates carried in the gaseous stream pass into the granular material and are retained in the body of granular material and upon the upstream face of the gas filter element. The body of granular material is moved through the zone and across the upstream face of the gas filter element to scour the upstream face and remove the collected particulates, which are carried out of the housing, such that a substantially uniform pressure drop across the apparatus is maintainable during its operation.

20 Claims, 9 Drawing Figures

U.S. Patent  Nov. 23, 1982  Sheet 1 of 3  4,360,364
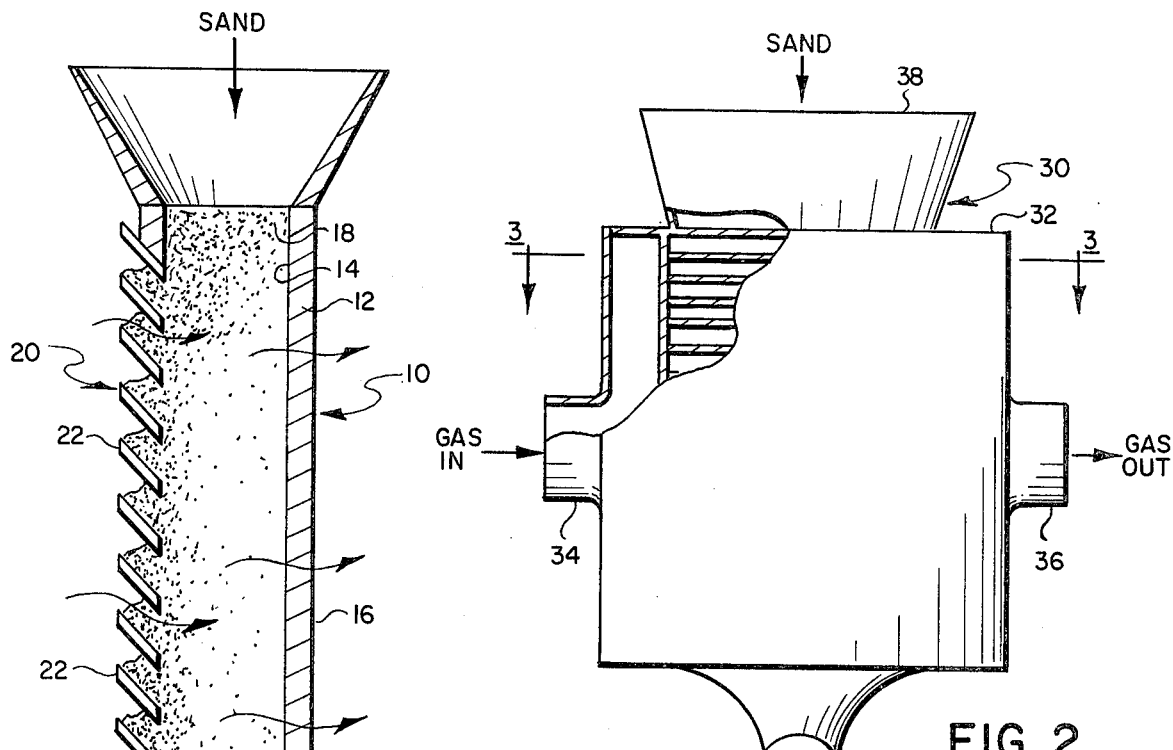
FIG. 1
FIG. 2
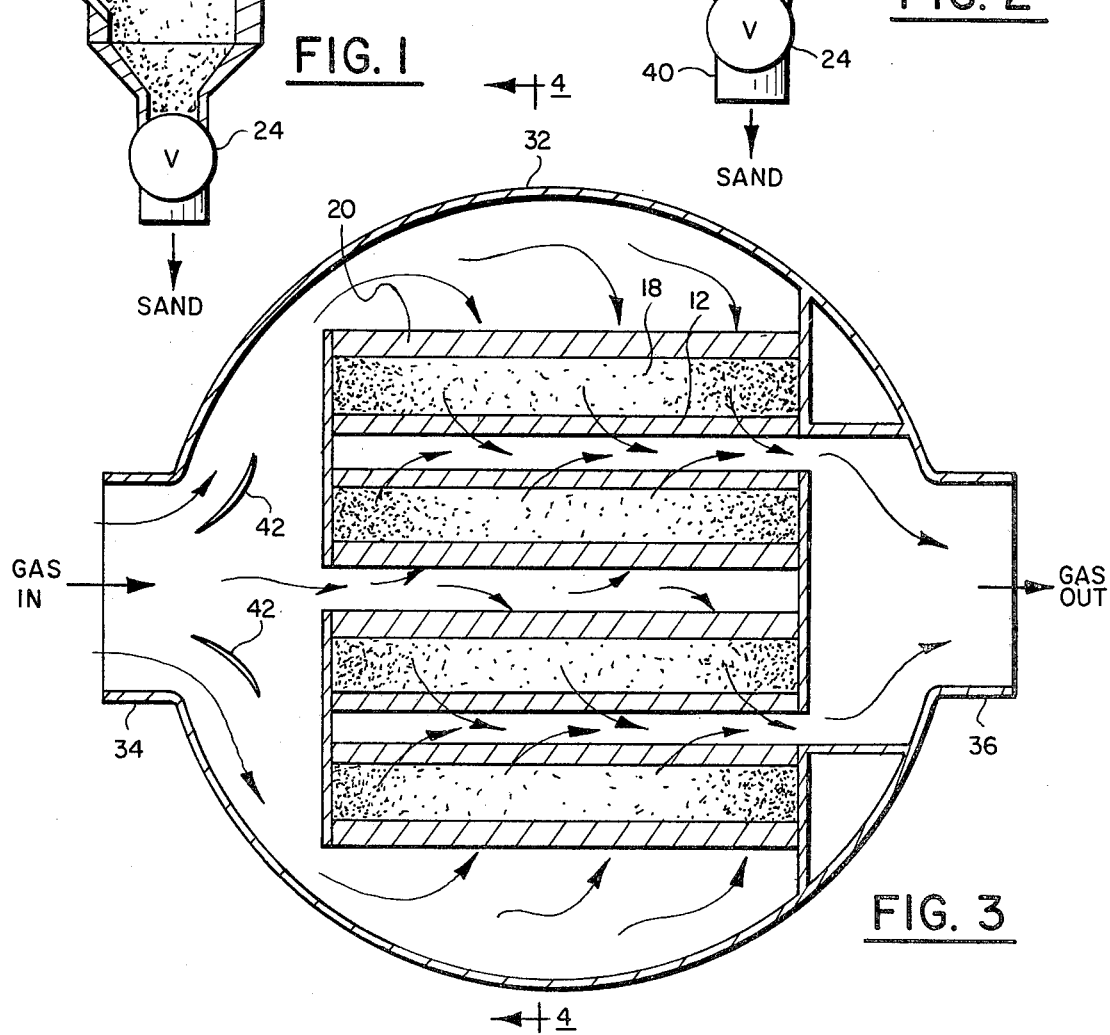
FIG. 3

FILTERING METHOD AND APPARATUS THEREFOR

This is a continuation of application Ser. No. 963,551, filed Nov. 24, 1978, now abandoned.

BACKGROUND OF THE INVENTION

1. Field of the Invention

This invention relates to the elimination of polluting constituents from gaseous streams. The invention is particularly applicable to the removal of solid particulates from a high temperature gas.

2. Prior Art

The problems of air pollution as a result of the venting of waste gases have been long recognized and the subject of a substantial amount of current research. Various techniques are being used to treat waste gases to separate, for example, fly ash from flue gases. In such treatment, gas filters, dynamic air-solids separators, wet scrubbers and electrostatic precipitators are used. All of these techniques, however, have certain disadvantages and very few of them are effective in the removal of gas phase impurities from such gaseous streams.

Bag filters or fiber fabric filters and rigid porous filters, for example, are fairly effective in removing solid contaminants from gaseous streams. However, such filters soon become clogged with the gas entrained particles which are collected, resulting in an unacceptable increase in pressure drop across the filter and necessitating the use of some means to clean the surface of the filters. One means, for example, to provide continuous filtering capability is to have a dual system, such that the gas can be diverted to one filter while the other is being back-flushed or cleaned. Another means is to provide a short pulse of pressure in a direction reverse to the normal flow. Still another means is to rap or shake the filter. When ceramic fibers are used to form a filter suitable for high temperature operation, the back flow pressure pulse and/or vibration used to clean them results in a breakage of the ceramic fibers and a substantially shorter life for the filter.

Another technique utilized to remove gas entrained particulates is to pass a contaminated gas through a bed of granular material such as sand. The gas-entrained particulates are collected on the upstream surface of and within the sand bed. The fixed bed suffers from the same disadvantage as the fiber or porous type filters discussed before, i.e., gas flow must be stopped for cleaning. The fluidized bed is continuous in operation but is less effective in removing small particles than a fixed or dense packed moving bed. Furthermore, it requires a substantially uniform flow of gas. More particularly, any sudden surge of gas going through the fluidized bed can result in not only the previously contained particulates passing through the bed but also a portion of the bed itself being entrained in the gas, thus adding even more to the particulate loading of the gas stream.

Moving beds are more efficient filters than fluidized beds (for equal bed thickness and material) but are not as efficient as static beds. It is believed that continuous motion of the bed dislodges some of the fine, collected particles which can then gradually migrate through the bed due to the force of the flowing gas. Nevertheless, this approach is useful and is the subject of several patents. For example, U.S. Pat. No. 1,570,869 discloses a two-stage arrangement in which the gas passes through a moving bed of granular material at least twice in order to enhance the removal of small particulates. A more recent patent, U.S. Pat. No. 4,017,278 describes the use of an annular moving bed flowing between concentric vertical cylinder walls which are perforated to allow the gas to pass through the bed into the space enclosed by the interior cylindrical wall. Moving beds have also been proposed for the removal of gaseous impurities.

U.S. Pat. No. 3,589,863 discloses a method of removing sulfur dioxide and particulate matter from gas streams. The acid gases and particulate matter are removed from gaseous streams by a process which comprises passing the gaseous stream through a bed of porous alkali metal bicarbonate aggregates. It is disclosed that the bed can be a fixed system or a counter-currently moving replenished system. The porous bicarbonate aggregates attract the particulate matter to their surfaces and thus remove them from the stream, while the acid gas is simultaneously reacted within or around the aggregates to form solids which leave the gaseous stream.

Another example of a moving bed is shown in U.S. Pat. No. 3,716,969 which discloses the use of two baffle walls which are downwardly inclined in a manner to provide an increase in the space between them in the downward direction. This is supposed to facilitate the downward flow of a body of granular material between the walls.

U.S. Pat. No. 3,296,775 discloses a method and apparatus for treating fluids and non-fluid materials which utilizes a moving bed of granular material. The patent is particularly concerned with the periodic removal of the granular material adjacent to the fluid entry face of the granular material bed (i.e., the surface) while retaining the remainder of the bed. The patentee suggests periodically causing a surge flow of a gas which sharply peaks substantially above and substantially immediately declines below the minimum steady flow rate at which the flow of gas causes motion of the granular material and in a reverse direction through the fluid entry portions of the apparatus to remove a portion of the granular material from the bed. Thus, particulates entrained in the gas which are collected on that surface are removed along with a portion of the granular material. The principal disadvantage of granular bed filters is that either a very thick bed or very fine granular material (or both) are required to give high efficiency removal of particulates in the 0.5 to 10-micron size range. The requirement for thick beds results in large expensive equipment, while the use of very fine granular material causes high pressure drop, poor bed flow characteristics, and bed particle entrainment in the product gas.

Wet scrubbers also are used for the removal of particulates and overcome some of the disadvantages hereinbefore described, namely, that of requiring periodic shutdown and cleaning. However, wet scrubbers also saturate the gas stream with moisture. Thus, the wet scrubbers cannot be used on hot, dry gas streams without cooling them to approximately the temperature representing equilibrium with liquid water at the scrubber exit conditions. This is an obvious waste of thermal energy and undesirable if a clean high temperature gas is required. Furthermore, when the gas is discharged to the atmosphere, upon further cooling, the moisture condenses causing an objectionable plume. Dynamic mechanical devices also have been used, a typical example being a cyclone scrubber. These devices also do not require frequent shutdown for cleaning. However, they are relatively ineffective for particles less than about 5 microns in diameter.

Electrostatic precipitators are frequently used for the removal of particulates from gaseous streams. Such devices have been found to be fairly efficient, however, a disadvantage of the electrostatic precipitator is that efficiency is affected by the electric resistivity of the particles, chemical composition of the gas, temperature and other factors. As a result, they are not economically applicable to many applications.

Thus, it is seen that there is still substantial room for improvement in the removal of particulate contaminants from gaseous streams. More particularly, the ideal particulate contaminant removal technique should be relatively simple, have a high efficiency for a broad range of contaminant sizes, should also be amenable to the removal of gas phase impurities, should not require shutdown for cleaning and should have a low and substantially constant pressure drop during operation. In addition, the technique should be applicable to both high and low temperature gas streams.

SUMMARY OF THE INVENTION

The present invention provides both apparatus for and a method of removing particulates from a gas stream, which stream may be within a wide range of temperatures. It is an advantage of the present invention that a periodic or frequent shutdown for cleaning is not required. It is another advantage of the invention that efficient removal of a wide range of particulate sizes is obtained. The present invention is also adaptable to the removal of gas phase contaminants.

The apparatus of the present invention provides a filter apparatus for removing particulate contaminants from a gas stream. The apparatus comprises a housing containing a substantially vertical granular material retention member which is provided with openings for the substantially unimpeded flow of gas therethrough. The housing also contains a substantially gas-permeable microporous filter element having upstream and downstream faces, and tortuous, i.e., restricted, flow paths therethrough. Typically, the filter element is formed from compressed or woven fibers, or sintered particles having a median diameter of from about 2 to 30 microns. The member and element are spaced apart to provide a passageway for the movement therethrough of a body of granular material (such as sand). The housing further includes a gas inlet means for the delivery of a particulate-containing gas to the granular material retention member and a gas outlet means for the removal of said gas from a downstream face of the gas-permeable filter element. The member and element provide the sole means for gas communication between the gas inlet and the gas outlet means. The apparatus further includes means for moving the body of granular material through the passageway in the housing.

In accordance with the method, a particulate-containing gas is introduced into the inlet of the apparatus. The gas and at least a major portion of the particles contained therein pass through the granular material retention member and into the body of granular material. Substantially all of the particles passing through the body of granular materials impinge upon and are collected on the upstream face of the gas-permeable filter element, the gas passing through the gas-permeable filter element and being recovered from a downstream face of said element substantially free of particulates. Either continuously or intermittently, the body of granular material is moved through the passageway and across the upstream face of the gas-permeable filter element whereby the particulate contaminants collected thereon are removed and there is maintained substantially constant desired pressure drop across the gas-permeable member.

In one embodiment of the method, fine particles (which are larger than the particles being removed from the gas stream but smaller than the bed material) are intentionally added to the bed. These fine particles are blown through the bed of granular material by the gas stream but are stopped by the microporous gas-permeable filter element where they act as a filter aid in the collection of contaminant particles and prevent them from entering the pores of the filter element. The granular bed particles, added fine particles, and collected contaminant particles move together out of the system. For example, a mixture of coarse sand (e.g., 10 to 14 mesh or approximately 1.7 mm) with a minor amount of very fine sand (e.g., about 20 to 100 microns) in conjunction with a microporous filter element (made up of a compressed sheet of 3-micron diameter ceramic fibers) could be used for removal of contaminant particles in the 0.5 to 5-micron diameter range.

BRIEF DESCRIPTION OF THE DRAWINGS

The invention will be more particularly described in conjunction with the following drawings wherein:

FIG. 1 is an elevation view in cross section of a filter panel of the present invention;

FIG. 2 is an elevation view of a preferred filter assembly which comprises a plurality of individual panel assemblies;

FIG. 3 is a top view of FIG. 2 taken along plane 3—3;

DESCRIPTION OF THE PREFERRED EMBODIMENT

Figure 4:
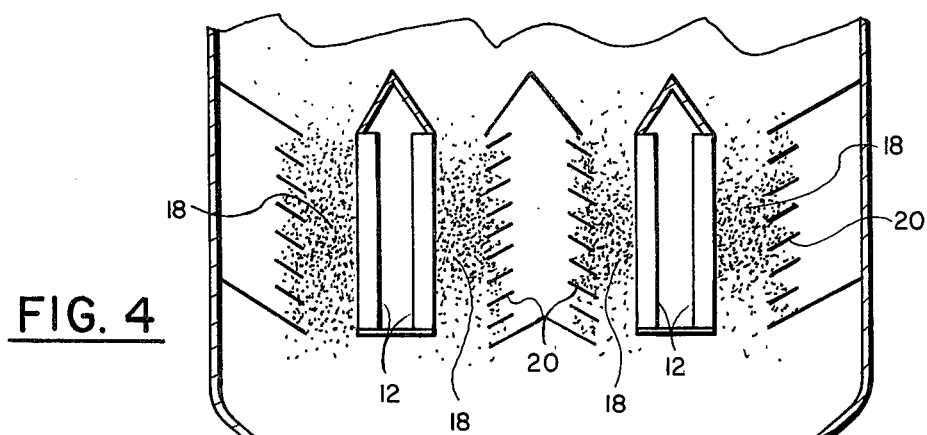
FIG. 4 is a side view of FIG. 3 taken along plane 4—4.

In the several figures like reference numbers refer to like parts having like functions. In FIG. 1, a filter panel of the present invention is generally designated by the reference numeral 10. The panel comprises as gas-permeable filter element 12 having an upstream face 14 and a downstream face 16, and formed from an appropriate filter material for the removel of particulates within a desired size range. Typically, the gas-permeable filter element 12 will be formed from fibers either woven in a dense cloth or randomly oriented fibers which have been compressed and/or sintered to form a felt or placque.

The selection of fiber materials is not particularly critical provided, of course, that it is not attacked by the contaminants contained in the gas stream to be processed and is capable of withstanding the anticipated operating temperatures. Thus, for low temperature gases, conventional fabric filter material may be used such as cotton, wool and the various synthetic fibers. It is a particular advantage of the present invention, however, that the more brittle ceramic filter materials also may be used as well as porous metal filters.

When the temperature is in excess of about 500° F., the ceramic or metal filter materials are required. Numerous filter materials are commercially available for the removal of particulates from a gaseous stream and the selection of a specific material or filter element to be utilized is well within the skill of one versed in the art. Generally, such materials provide a plurality of tortuous flow paths for the passage of gas therethrough and the retention of entrained particulates on the upstream surface.

It is a requirement of the invention that the gas-permeable filter element be capable of removing the desired amount of particulates by itself since the principal function of the body of granular material is to scour the filter element rather than trap particulates. The preferred filter elements are commercially available and have normal operating efficiencies in excess of 80%.

For a filter sheet material to be highly effective for the removal of particles in the 0.5 to 10-micron range, it is normally necessary that it be fabricated from particles or fibers which are less than about 30 microns in diameter (typically, 2 to 30 microns). Particle removal by such filters occurs primarily as a result of diffusion, interception, and inertial collection. Inertial collection predominates for clean filters, i.e., the gas flows around the fibers while the particles continue in a straight line impacting on the fibers. The particles build up, bridge between fibers, and eventually form a "cake" on which interception, i.e., sieving action predominates. Diffusion is important only with vapor-phase impurities (molecules) and very small particulates (less than about 0.5 microns in diameter).

Adjacent to the upstream wall 14 of gas-permeable filter element 12 is a body of granular particulate material 18. The granular material may be sand or other inert material if the sole desire is to filter particulate matter from the gas stream. It will be appreciated, however, that the granular material also could be an active material or contain an active material for removal of acid or other reactive impurity constituents of the gas stream. For example, if the gaseous stream contained $SO_2$, the granular material could be solid granules of an alkali metal bicarbonates or could be sand mixed with an alkali metal bicarbonate for the absorption and removal of the sulfur constituent. If the gas stream contains $H_2S$, the granular material could be iron oxide, zinc oxide, or other metal oxide which is reactive with $H_2S$. If the gas stream contains reactive "fume" particles such as $AlCl_3$ in sizes below 0.1 micron, the granular material could be activated alumina; and if the gas stream contains trace hydrocarbon vapors such as benzene, the granular material could be activated carbon. Numerous other equivalent active materials will be readily apparent to those versed in the art.

The granular material is maintained in position by a substantially vertical granular material retaining member designated generally as 20 and depicted as a plurality of louvers 22. The louvers 22 are shown as solid members, however, it will be readily apparent to those versed in the art that they also could be formed from a screen or other perforated body provided the openings or size of the perforations were smaller than the size of the granular material selected. The granular material retaining member 20 and gas-permeable filter element 12 provide a granular material passageway for confining the body of granular particulate material 18. Preferably, the granular material is introduced into the passageway through the top of filter panel 10 such that it is fillable by gravity, the rate of flow being regulated by a valve 24 located adjacent to the bottom of filter panel 10. The rate at which the granular material is moved through the passageway is not particularly critical, provided of course, it is sufficient to provide some scouring action. A high rate of movement results in an unnecessary expenditure of energy. Generally, very good results are obtained when the body of granular material is moved across the upstream face of the filter element at a velocity within the range of from about 0.1 to 10 feet per minute.

The thickness or depth of the body of granular material 18 is determined, of course, by the spacing between member 20 and element 12. The dimension is not particularly critical provided it is sufficiently deep to allow for the uniform flow of granular material through the passageway, i.e., at least about 10 times the diameter of the particles of granular materials. The maximum thickness is, of course, limited by the amount of pressure drop which can be tolerated across the filter panel and the economics of the system. Specifically, the thicker the body, the higher the pressure drop, which results in a corresponding increase in pumping requirements and cost. Generally, it is preferred that the pressure drop across the panel be less than about 10% of the inlet pressure of the gas stream to be filtered and preferably less than about 5%. It is a particular advantage of the present invention that it is possible to assemble a panel through which the pressure drop is less than 2% of the inlet pressure of the gas to be filtered and to maintain that pressure drop substantially constant independent of the particulate loading of the gas being treated. Generally, the depth of body 18 will be within a range of from about one inch to eighteen inches, with particularly good results being obtained with a depth of from about 2 to 10 inches.

It is a particular feature of the present invention, as contrasted to the prior art moving bed filters, that the granular material is selected to have a median grain or particle size in excess of that which would collect a major portion of the particulate contaminants as a "cake" on the upstream surface of the body of granular material. Thus, by selecting granular material with a larger median grain size, the major portion of the particulate contaminants pass through the upstream surface of the body of granular material, and are collected in the body of granular material and upon the upstream face of the gas-permeable member. Generally, it is preferred that the granular material have a median grain size of at least 20 times that of the median size of the particles to be collected. For example, when the gas stream to be treated is a flue gas having particles within the range of from about 1 to 10 microns, a body of granular material having a median grain size larger than 100 microns is preferred. Particularly good results are obtained when the granular material has a median grain size within the range of from about 0.2 to 5 mm.

It also is contemplated within the scope of the present invention to treat the granular material for reuse. Specifically the granular material withdrawn from the apparatus after scouring the face of the gas-permeable filter element is readily treatable to remove the particulate contaminants contained therein, for example, by sieving, elutriation, washing or the like. When the granular material includes an active material which has reacted with gas phase impurities, the reacted materials also are readily removed by conventional techniques and disposed of or regenerated for reuse.

Referring now to FIGS. 2, 3, and 4, therein is depicted a filter assembly 30 of the present invention that comprises a housing 32 containing a plurality of pairs of substantially vertical granular material retaining members 20 and pairs of gas-permeable filter elements 12 arranged in an alternate array to form a plurality of passageways for the body of granular material 18. Housing 32 is provided with a gas inlet means 34 and a gas outlet means 36. It also is provided with a means for passing a body of granular particulate material through the passageways, such as a granular material inlet 38 and outlet 40, the flow of granular material through the housing and passageways being regulated, for example, by hopper valve 24. Optionally, filter assembly 30 also may include within housing 32 a plurality of baffles 42 to ensure that each of the filter elements 12 receive an equivalent amount of the gas to be filtered.

Figure 5:
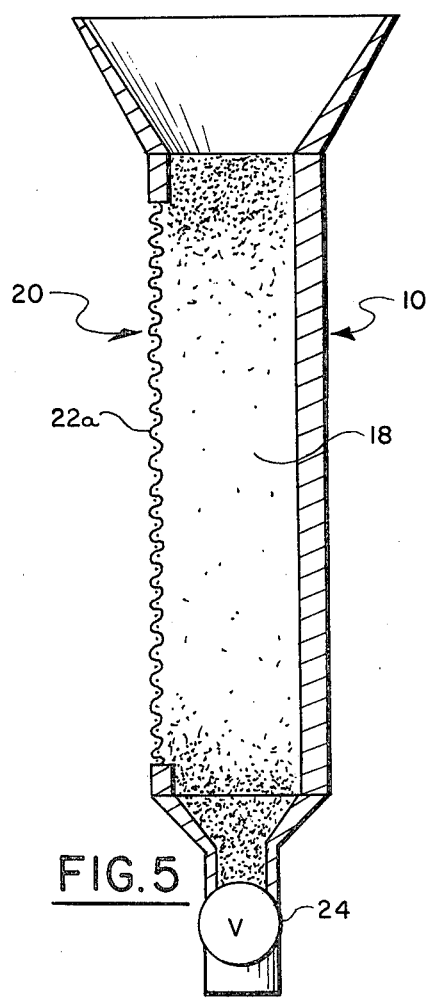
FIG. 5 is a vertical section of a filter panel of the present invention showing an alternate configuration for the granular material retention member.
Figure 6:
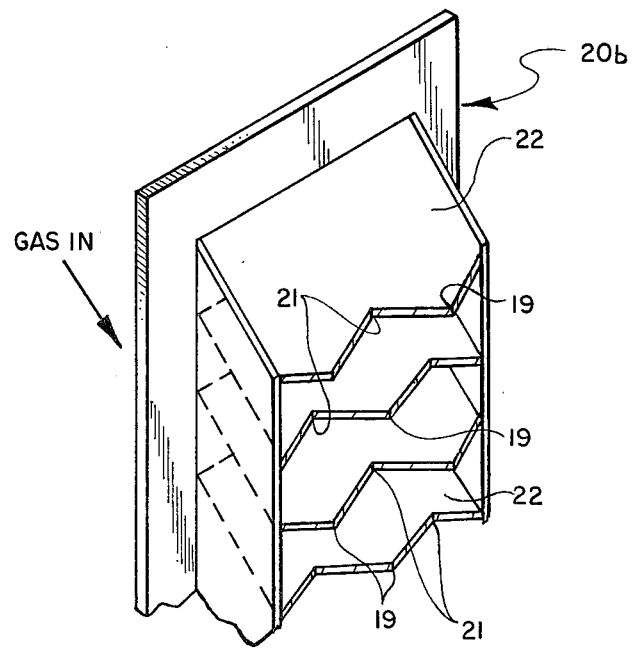
FIG. 6 is a pictorial view of a filter panel of the present invention showing yet another configuration of the granular material retention member.

FIG. 5 depicts an alternate embodiment of the filter panel 10 wherein granular material retaining member 20 comprises a screen 22a. FIG. 6 is a pictorial sketch of a particularly preferred granular material retention member 20b wherein the individual louvers or slats 22 are provided with an irregular downstream edge. In the embodiment depicted, slats 22 are provided with a sawtooth configuration wherein each downstream point 19 is in vertical alignment with a downstream slot or vee 21 of the adjacent slats 22. Such a configuration provides an increased surface area exposed to the particulate containing gas thereby reducing the possibility of a cake buildup on the downstream edges of slats 22. Also, the staggered arrangement of points 19 and vee's 21 provide an irregular flow path for the body of granular material 18 which further assists in the prevention of a cake buildup.

It will be appreciated that while in the preferred embodiments depicted, gas-permeable filter-element 12 is shown in each instance as being substantially vertical, it also could be inclined to the horizontal and still utilize a gravity flow of the body of granular material 18. It also will be apparent to those versed in the art that sand could be introduced into a bottom portion of the apparatus and forced upwardly therethrough. However, this would unduly complicate the practice of the invention and therefore is not a preferred or desirable technique.

The present invention is particularly suitable for performing high efficiency cleanup of a gas which has passed through a fluidized bed. In fluidized bed combustion of coal, for example, it is desirable to perform the combustion under pressure, then expand the high temperature combustion gas through a gas turbine to extract power before passing it to a steam boiler. This arrangement results in a very high efficiency system for generating electric power. Unfortunately, fine particles of fluidized bed material or coal ash cause severe erosion of the expansion blades of the turbine, hence very high efficiency removal of fine particles is required. In the proposed application of the invention, material for the fluidized bed is used as the granular material in the filtration apparatus. Clean granular material intended for use in the fluidized bed is first fed to the top of the filtration apparatus and then drained from the bottom of this unit directly into the fluidized bed (together with collected fine particles). Spent fluidized bed material is removed as required for regeneration and removal of particulates or disposal as desired.

EXAMPLE

A series of tests were run using an apparatus substantially as depicted in FIG. 1. The tests were conducted utilizing a gas at temperatures up to 1350° F. and nominal particulate loadings of from 0.8 to 3.8 grains per standard cubic foot. Two types of entrained dust particles were utilized, i.e., (1) particulate salts collected from the off-gas of a molten salt bath carbonaceous material combustor and (2) fly ash collected by an electrostatic precipitator from an electric power station. In addition, two types of granular material were utilized. One was a 28×48 mesh (approximately 300 to 700 micron) alumina and the other a 40×70 mesh (approximately 200 to 400 micron) silica. Both types of sand gave similar results. The gas-permeable filter element was formed from ceramic fiber and obtained commercially as Saffil alumina paper. The ceramic fibers comprised relatively pure aluminum oxide and had a nominal diameter of 3 microns. The fibers are formed into a porous mat having a thickness of about 1/16 of an inch.

It will be appreciated that fluctuations in the gas flow rate or temperature also can affect the pressure drop and such extraneous variables could obscure any observation of the desired effect of the present invention. Therefore, the results are presented in terms of the "flow resistance" rather than a pressure drop. Flow resistance is defined as the ratio of the pressure drop to the air-to-cloth ratio as shown in the formula below:

$$\text{Flow resistance} = \frac{\Delta P}{\text{air/cloth}} = \frac{\text{in } H_2O}{afpm}$$

where the air-to-cloth ratio is the volumetric flow rate divided by the face area of the gas-permeable filter element. It has units of velocity of (actual feet per minute) and is equal to the face velocity of the gas passing through the filter. Thus, it is seen that the flow resistance is independent of the flow rate and temperature but does increase with an increase in pressure drop caused by a particulate accumulation on the gas-permeable filter element. In these experiments the air-to-cloth ratio was 9 to 12 afpm.

Figure 7:
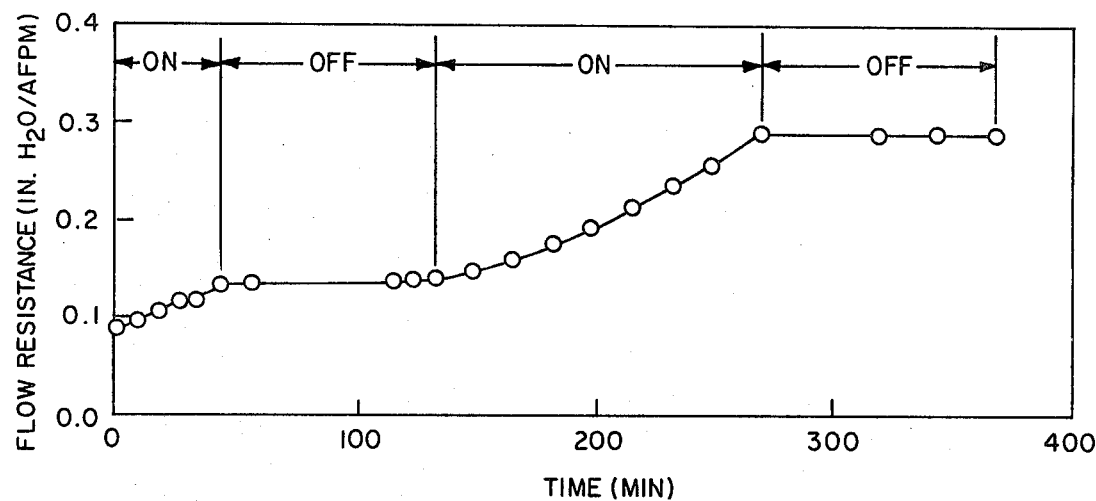
FIGS. 7, 8, and 9 are graphic representations of flow resistance versus time for a series of tests.

Referring now to FIG. 7, flow resistance is plotted against time while the apparatus is filtering particulate fly ash. Particulates were added to the feed gas during periods marked "ON" in FIG. 7. Beginning with a clean gas-permeable filter element and with no granular material present in the apparatus, the flow resistance increases, as expected when particulates are injected into the gas flow and remains substantially constant when the gas is free of particulates. Further, the data of FIG. 7 indicate that the accumulation of the particulate layer on the gas-permeable filter element causes the pressure drop to rise at the rate of about 0.88 inches of water per hour (the pressure drop being equal to the flow resistance times the air-to-cloth ratio). Thus, if nothing were done to remove the dust layer, the pressure drop would increase to in excess of about 6 inches of water in about 7 hours. It must be appreciated that commercial fabric filters on utility boilers generally are operated at a maximum pressure drop of about 6 inches of water. At higher pressure drops, the fan-power requirements would make the system uneconomical. Thus, this test demonstrates the disadvantage of a conventional gas-permeable filter element.

Figure 8:
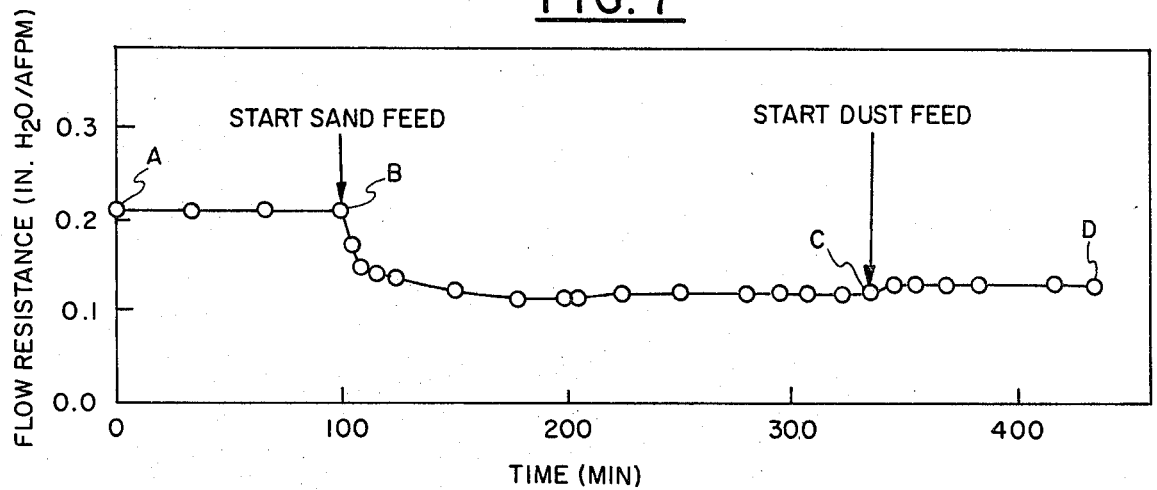

In FIG. 8, there is depicted the effect of adding sand to the apparatus. The dust layer was left on the filter element, while silica sand was added to the system. The furnace also was left on during the addition of sand to maintain the apparatus at the desired high temperature. Thereafter, a clean high temperature flow of gas was passed through the apparatus. Point A in FIG. 8 shows the flow resistance of the system after the sand addition was completed. The drop in the flow resistance from 0.29 at the end of FIG. 7 to 0.21 at Point A in FIG. 8 is due in part to a portion of the particulate layer being removed from the gas-permeable filter element during the addition of the sand. From Point A to B, the sand is stationary and the flow resistance is substantially constant. At Point B, a sand feeder was turned on to move the body of sand through the apparatus. It is seen that the flow resistance immediately starts dropping as the particulate layer is removed from the gas-permeable filter element. The flow resistance leveled at 0.123 and remained there. At Point C, particulates were injected into the gas stream passing through the apparatus. The flow resistance increases slightly for 10 minutes and then remains constant thereafter at about 0.133. Without the body of moving sand, it was demonstrated in FIG. 7, that in approximately 110 minutes the pressure drop would have more than doubled. Instead, the pressure drop remained constant at 1.46 inches of water within ±0.7%.

Figure 9:
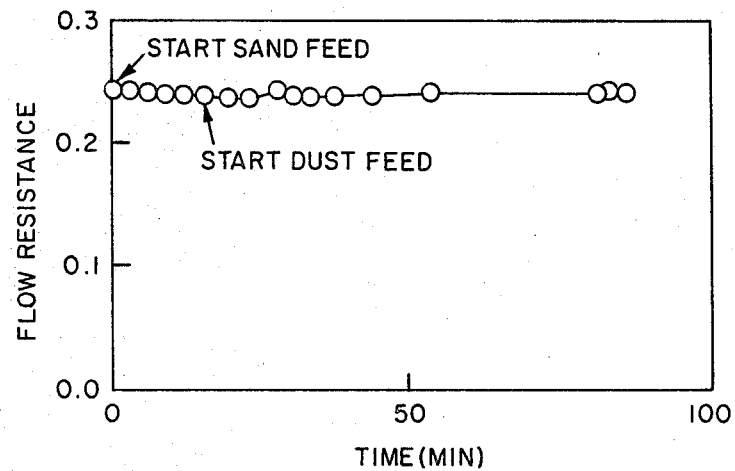

Referring now to FIG. 9, therein is depicted a plot of flow resistance versus time using the apparatus of the present invention to filter a gas stream containing entrained salt particles. The gas-permeable filter element is the same as in the previous experiment and the granular material utilized was alumina sand. From FIG. 9 it is seen that the pressure drop remains substantially constant throughout the test. By contrast, had the sand been stationary, the pressure drop would have risen at a rate of about 0.8 inches per hour as demonstrated in the previous test. Thus, this example clearly demonstrates the efficacy and utility of the present invention.

In addition, throughout the tests, the collection efficiency was measured using a gravimetric method. The sensitivity of the measuring method was such that an amount of particulates in the product exit gas in an amount equal to 0.04% of that in the inlet gas would be detected. No dust particles could be detected coming out of the filter, thus indicating that the collection efficiency was greater than 99.96%.

What is claimed is:

1. A filter apparatus for removing fine particulates from a gas stream comprising:
    a housing containing a substantially gas-permeable microporous filter element having restricted flow paths therethrough for the collection, adjacent an upstream face thereof, of fine particulates from a gas stream with an efficiency greater than 80 percent;
    a substantially vertical granular material retention member having upstream and downstream faces and provided with openings for the substantially unimpeded flow of a fine particulate-containing gas stream therethrough, said retention member being located in said housing and having its downstream face spaced apart from the upstream face of said microporous filter element to provide a passageway therebetween;
    a body of granular material disposed in said passageway and permeable to the flow of the fine particulate-containing gas stream therethrough;
    gas inlet means for the delivery of the fine particulate-containing gas stream to the upstream face of said retention member for passage through said retention member and body of granular material to the upstream face of said microporous filter element for collection of particulates from the gas stream;
    means for scouring the upstream face of said microporous filter element with the granular material by at least intermittent movement of said body of granular material adjacent said upstream face of said microporous filter element to remove collected fine particulates therefrom; and
    gas outlet means for the removal of a substantially particulate-free gas stream from a downstream face of said microporous filter element, said retention member, body of granular material, and microporous filter element providing the sole means for gas communication between said gas inlet and gas outlet means.

2. The apparatus of claim 1 wherein the granular material has a median particle size at least twenty times that of the fine particulates to be removed.

3. The apparatus of claim 2 wherein the fine particulates have a size within the range of from about 1.0 to 10 microns.

4. The apparatus of claim 3 wherein the granular material has a median particle size within the range of from about 0.2 to 5.0 millimeters.

5. The apparatus of claim 4 wherein said microporous filter element is formed from fibers having a diameter within the range of from about 2 to 30 microns.

6. The apparatus of claim 4 wherein said means for scouring provides for continuous movement of said body of granular material.

7. The apparatus of claim 4 wherein said microporous filter element is formed from ceramic fibers.

8. The apparatus of claim 1 wherein there is provided a plurality of retention members and microporous filter elements.

9. A method of removing fine particulates from a gas stream comprising:
    passing a fine particulate-containing gas stream through a body of granular material to a substantially gas-permeable microporous filter element;
    collecting said particulates adjacent an upstream face of said microporous filter element;
    scouring said upstream face of said microporous filter element to remove the particulates therefrom by moving said body of granular material across said upstream face of said microporous filter element, thereby maintaining the gas stream pressure drop across the body of granular material and the microporous filter element within a desired range while concurrently removing particulate contaminants from the gas stream; and
    withdrawing a substantially particulate-free gas stream from the downstream face of said microporous filter element.

10. The method of claim 9 wherein the granular material has a median particle size at least twenty times that of the fine particulates to be removed.

11. The method of claim 9 wherein said granular material has a median particle size within the range of from about 0.2 to 5.0 millimeters.

12. The method of claim 11 wherein the fine particulates have a diameter of from about 1.0 to 10 microns.

13. The method of claim 12 wherein said microporous filter element is formed from fibers having a diameter within the range of from about 2 to 30 microns.

14. The method of claim 9 wherein said body of granular material is moved continuously to provide a substantially constant desired gas stream pressure drop during operation.

15. The method of claim 9 wherein said microporous filter element is formed from ceramic fibers and the fine particulate-containing gas stream is introduced at a temperature in excess of about 500° F.

16. The method of claim 9 wherein said body of granular material is moved across the upstream face of said microporous filter element at a velocity within the range of from about 0.1 to 10 feet per minute.

17. The method of claim 9 wherein the gas stream also contains gas-phase impurities and the granular material includes an active material to react with said gas-phase impurities.

18. The method of claim 9 wherein a fine particulate filter aid having a median particle size of from about 20 to 100 microns is incorporated into said body of granular material.

19. The method of claim 9 wherein the granular material is collected for reuse after scouring the upstream face of said microporous filter element.

20. The method of claim 9 wherein said fine particulate-containing gas stream is an effluent gas from a fluidized bed, and the granular material is transferred to said fluidized bed after scouring the upstream face of said microporous filter element.

* * * * *